United States Patent [19]

Lescaut

[11] Patent Number: 5,009,737
[45] Date of Patent: Apr. 23, 1991

[54] METHOD OF JOINING PIPES AT THEIR ENDS TO FORM A PIPELINE

[75] Inventor: Pierre L. Lescaut, Bernay, France

[73] Assignee: Atochem, Puteaux, France

[21] Appl. No.: 360,155

[22] Filed: Jun. 1, 1989

Related U.S. Application Data

[63] Continuation of Ser. No. 182,215, Apr. 15, 1988, abandoned.

[30] Foreign Application Priority Data

Apr. 16, 1987 [FR] France ................................ 87 05446

[51] Int. Cl.⁵ ............................................ B29C 63/30
[52] U.S. Cl. .................... 156/264; 156/293; 156/294; 156/309.6; 264/269; 285/55
[58] Field of Search .............. 156/158, 264, 293, 294, 156/304.2, 304.3, 304.6, 309.6; 228/119, 168, 175, 176; 285/31, 55, 285, 286, 291; 264/248, 269; 29/460

[56] References Cited

U.S. PATENT DOCUMENTS

| | | |
|---|---|---|
| 2,241,517 | 5/1941 | Moise ................................ 285/55 |
| 3,388,447 | 6/1968 | Bange et al. . | |
| 3,541,670 | 11/1970 | McCrory ............................ 285/55 |
| 3,817,805 | 6/1974 | Surikov et al. . | |
| 4,092,193 | 5/1978 | Brooks ............................... 156/294 |
| 4,357,745 | 11/1982 | Chlebowski ........................ 285/55 |
| 4,360,961 | 11/1982 | Chlebowski ........................ 29/460 |
| 4,509,776 | 4/1985 | Yoshida et al. ..................... 285/55 |
| 4,611,833 | 9/1986 | Lescaut .............................. 285/55 |
| 4,614,369 | 9/1986 | Overath et al. ..................... 285/55 |
| 4,691,740 | 9/1987 | Svetlik et al. ...................... 285/55 |
| 4,780,072 | 10/1988 | Burnette ............................ 118/306 |
| 4,913,465 | 4/1990 | Abbema et al. ..................... 285/55 |

FOREIGN PATENT DOCUMENTS

| | | |
|---|---|---|
| 189934 | 8/1986 | European Pat. Off. . |
| 99425 | 8/1973 | Fed. Rep. of Germany . |
| 3049431 | 10/1981 | Fed. Rep. of Germany . |
| 2416764 | 10/1979 | France ................................ 228/168 |
| 2434330 | 3/1980 | France . |
| 2438788 | 5/1980 | France . |
| 0122198 | 7/1983 | Japan ................................. 228/175 |

Primary Examiner—Michael W. Ball
Assistant Examiner—Steven D. Maki
Attorney, Agent, or Firm—Burns, Doane, Swecker & Mathis

[57] ABSTRACT

A pipeline arrangement includes first and second pipe sections joined at the axial ends thereof and has a heat-sensitive covering extending between the axial ends of the pipe sections and lining the inner walls thereof. The heat-sensitive covering extends across the joint between the sections to provide a continuous covering of the inner walls of the pipeline. A method and apparatus for finishing the inner covering are also disclosed.

10 Claims, 4 Drawing Sheets

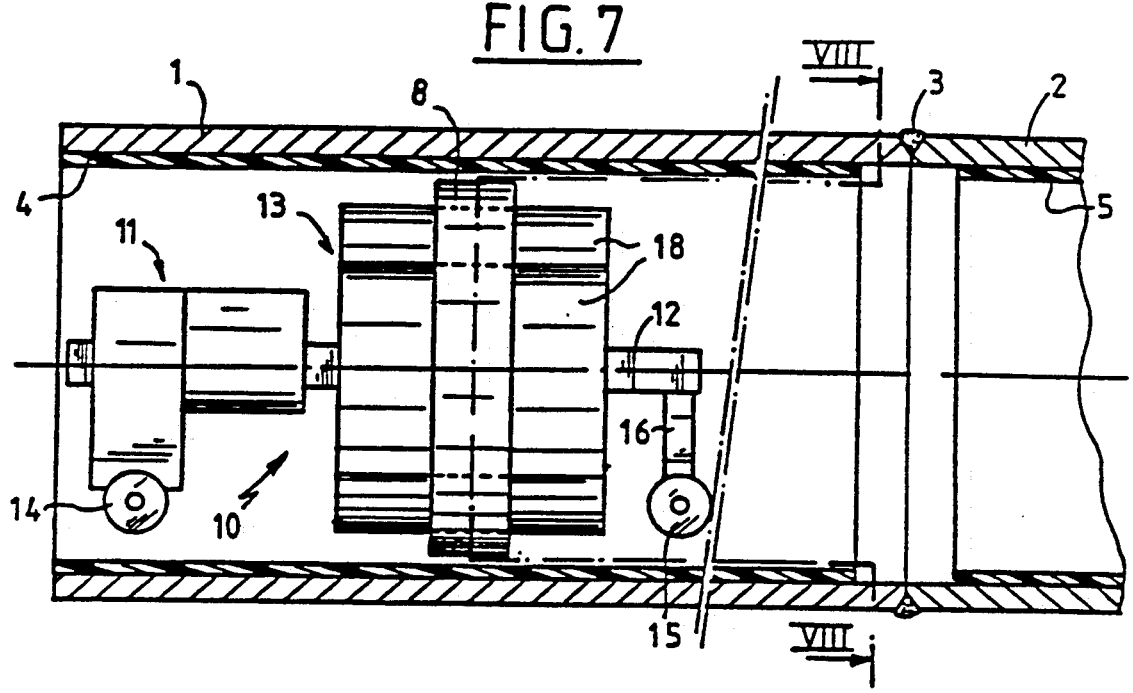
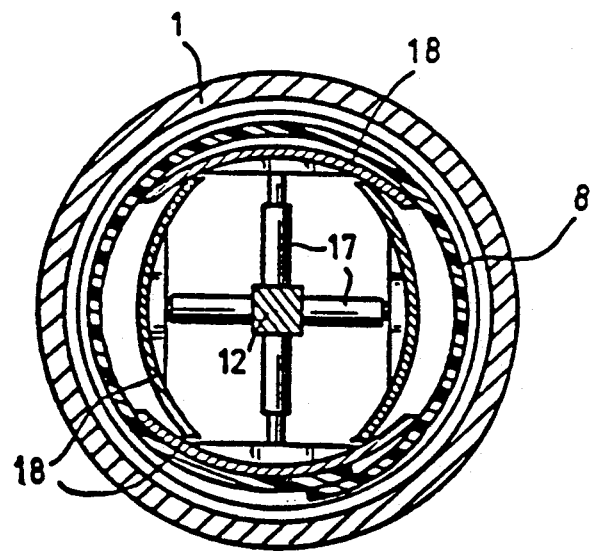

METHOD OF JOINING PIPES AT THEIR ENDS TO FORM A PIPELINE

This application is a continuation of application Ser. No. 07/182,215, filed Apr. 4, 1988, now abandoned.

BACKGROUND OF THE INVENTION

1. Field of the Invention

The present invention relates to large-diameter metal pipes joined at their ends (for example, pipes for oil pipelines or fuel pipelines of a diameter equal to or greater than 200 mm), the inner wall of which is equipped with a heat-sensitive covering. It also relates to a process for producing the joined metal pipes and to an apparatus for carrying out the process.

2. Discussion of the Prior Art

At the present time, the pipes are produced in sections of a length of 6 to 15 m and are equipped with an inner covering which is corrosion-proof or abrasion-proof according to the fluids conveyed.

The term "fluids" is intended to refer in the most general way to petroleum liquids, water, chemical solutions and lyes and suspensions in water of solids, such as small coal or various slurries.

Pipes designed for conveying these fluids usually receive internal protection which, depending on the circumstances and the degree of development in the art, comprises centrifuged cement, bitumens, coverings based on thermoplastic resins, coverings based on thermosetting resins or coverings based on elastomers.

With all of these coverings, because of their tendency to cracking, their fusibility or their tendency to pyrolysis at the temperature used for joining the pipes, according to circumstances, it is necessary to reserve, at the ends of the pipes, an uncovered part, of which the dimension in the axial direction of the pipes, i.e. in the direction of the generatrices of the pipes, can vary between half and double the diameter, according to the pipe diameter, the wall thickness of the pipes and the type of covering.

These uncovered parts are therefor subject to corrosion or abrasion which is intense because it is concentrated, and which necessitates expensive replacement of the pipes after more or less long periods of time.

Other solutions resort to metal flanges equipped with elastomeric lips bearing on the inner covering which, in this case, is provided up to the ends of the pipe sections without any reserve. The disadvantage of such solutions is that the elastomeric lips do not withstand the high pressures and have to be reserved for low pressures only (below 3500 kPa).

Another solution involves using stainless-steel connecting rings. This is a solution which still entails a high outlay and which can even result in the use of complex techniques when the inner covering of the pipes is thick, for example if an especially high abrasion resistance is sought. A shoulder allowing for the thickness of the covering then has to be provided, and good sealing is difficult to obtain in this case. Moreover, whatever the composition of the heat-sensitive covering with which the inner wall of the pipes is equipped, in all cases there is a difference in composition between the adjacent coverings and therefore a difference in their abrasion resistance, thus resulting in a difference in the wear of the surfaces of the coverings and, in the long term, a variation in the inside diameter of the pipes near the junction.

SUMMARY AND OBJECTS OF THE INVENTION

The solution provided according to the invention involves much less outlay and makes it possible to obtain metal pipes which are joined at their ends and the adjacent coverings of which are in many cases of an identical composition.

According to the invention, the part still uncovered after joining is likewise equipped with a heat-sensitive covering.

In this description, by "part still uncovered after joining" is meant that part of the inner wall of the joined pipes located near the junction and still uncovered after joining.

The heat-sensitive covering, with which the part still uncovered after joining is equipped, can be based on any fusible heat-sensitive material which can be prepared in strip form. In particular, the material can be selected from thermoplastic resins, thermosetting resins provided with at least one hot-acting cross-linking agent, or elastomers.

The heat-sensitive covering, with which the inner wall of the pipes is equipped before joining, can be based on any material conventionally used, such as water-proof cement, bitumens, cold-curing catalysed epoxy resins, thermoplastic resins, thermosetting resins or elastomers.

Thermoplastic resins which may be mentioned are polyamides, fluorocarbon resins, polyethylenes and polymers of vinyl chloride.

Polyurethanes may be mentioned as thermosetting resins.

The heat-sensitive covering, with which the part still uncovered after joining is equipped, can be of a composition different from that of the covering with which the inner wall of the pipes is equipped before joining, but it is preferably of identical composition in all cases where the covering, with which the inner wall of the pipes is equipped before joining, is based on a fusible heat-sensitive material.

According to the invention, the thickness of each heat-sensitive covering is generally from 0.5 to 6 mm and preferably from 2 to 5 mm.

According to the process of the invention, the heat-sensitive covering of the inner wall of pipes joined at their ends, the inner wall having an uncovered part at at least one of the pipe ends before joining, is finished by applying, via one of its faces, a strip of fusible material to the part still uncovered after joining, then bringing the strip of material to the fused state and simultaneously exerting on the other face of the strip of material a pressure sufficient for thinning it, widening it and welding it to the adjacent covering.

The relative pressure exerted on the other face of the strip of material is generally between 10 and 100 kPa.

For preparing joined pipes used in accordance with the process of the invention, pipes, the inner wall of which is equipped with a heat-sensitive covering and has an uncovered part at at least one of the ends, can be obtained in any way known per se, conventionally in a workshop, by laying the covering onto the inner wall of the pipe over a length less than the total length of the pipe, there being, at at least one of the ends, an uncovered part or reserve, of which the dimension in the direction of the generatrices of the pipe is generally between one tenth and double the diameter. The function of the reserve is to protect the heat-sensitive covering from fusion or pyrolysis caused as a result of the rise in temperature which the operation of joining the pipes on site would bring about.

For the preparation of joint pipes used in accordance with the process of the invention, the pipes can be joined at their ends by means of any technique known per se, such as, for example, welding or bell-seam fitting and, more generally, butt welding by means of a build-up bead.

Where joining by butt welding is concerned, the wall of each pipe has an uncovered part at each end of the pipe before joining. After joining, the two uncovered parts together constitute the part still uncovered after joining.

With regard to joining by bell-seam fitting, only the inner wall of the bell-shaped ends of the pipes has, before joining, an uncovered part corresponding to the bell-shaped part. After joining, the portion of the bell-shaped part of the inner wall of the female end of one of the pipes which is not in contact with the outer wall of the corresponding male end of the other part forms the part still uncovered after joining.

The strip of material is of a volume substantially equal to that of the cavity formed as a result of joining and arranged in line with the part still uncovered after joining, and is generally of a width ranging from 0.60 to 0.90 times the width of the cavity, as measured in the direction of the generatrices of the pipes, and of a thickness ranging from 1.10 to 1.65 times the depth of the cavity, as measured in the radial direction.

The phrase "substantially equal" volume is taken as meaning that the volume of the strip of material does not differ by more than 3% from that of the cavity formed as a result of joining and arranged in line with the part still uncovered after joining and is preferably equal to it.

The strip of material, after being thinned, widened and welded to the adjacent covering under the conditions of the process, forms the heat-sensitive covering with which the part still uncovered after joining is equipped.

If the heat-sensitive covering, with which the part still uncovered after joining is to be equipped, is of a composition different from that of the heat-sensitive covering with which the inner wall of the pipes is equipped before joining, an adhesive bonding material, such as, for example, an epoxy resin is advantageously deposited, on the one hand, on the face of the strip of material to be applied to the part still uncovered after joining and, on the other hand, to the lateral faces of the strip of material.

The strip of material can be produced as a result of the transverse cutting of a ring obtained by cross-cutting a tube of the material and being of an outside diameter substantially equal to the inside diameter of the uncovered pipes. The tube of the material can be prepared, for example, by rotational molding, where a material based on a thermoplastic resin is concerned, or by extrusion in the case of a material based on thermoplastic resin or based on thermosetting resin.

The phrase "substantially equal" outside diameter is taken as meaning that the outside diameter of the tube of the material does not differ by more than 1% from the inside diameter of the uncovered pipes and is preferably equal to it.

In this description, by "uncovered pipes" are meant metal pipes of which the inner wall is not equipped with a covering.

The present invention also relates to an apparatus for carrying out, after joining, the finishing of the covering of the inner wall of pipes according to the process of the invention.

The apparatus which is the subject of the invention comprises means for applying the strip of material, via one of its faces, to the part still uncovered after joining and for exerting pressure on the other face of the strip of material, and means for bringing the strip of material to the fused state.

Advantageous means for applying the strip of material, via one of its faces, to the part still uncovered after joining and for exerting pressure on the other face of the strip of material consist generally of metallic clamping blades actuated by jacks mounted on a self-propelled carriage movable inside the pipes parallel to their axis preferably in both directions of movement. The outer face of the clamping blades is preferably polished and advantageously covered with an anti-adhesive agent, such as, for example, silicone resins, so that, after the fusion of the strip of material, there is no adhesion of the material to the outer face. The jacks can operate electrically or by fluid pressure. The carriage can be remote-controlled by means of electrical cables and fluid conduits of jacks or can be made independent by means of an accumulator battery, a fluid-pressure appliance and a programming device which are arranged on the carriage.

With regard to the means used to bring the strip of material to the fused state, any means making it possible to supply heat from outside the pipes, such as, for example, an induction unit, an infra-red appliance or a heating collar may be employed.

BRIEF DESCRIPTION OF THE DRAWING

The preferred embodiment of the invention is discussed in the following detailed description which should be considered in connection with the figures in the accompanying drawing, in which:

FIG. 7 is an axial section view of the pipes and a side elevational view of a self-propelled carriage in the stopping position at the free end of one of the joined pipes shown in FIG. 1;

FIG. 8 is a sectional view along the line VIII—VIII of FIG. 7;

DETAILED DESCRIPTION OF THE PREFERRED EMBODIMENT

FIGS. 1, 5, 6, 7 and 9 show the two pipes 1 and 2 joined by butt welding by means of a build-up bead 3. In these figures, numerals 4 and 5 denote a heat-sensitive covering with which the inner wall of the pipes 1 and 2 respectively is equipped before joining.

Figure 1:
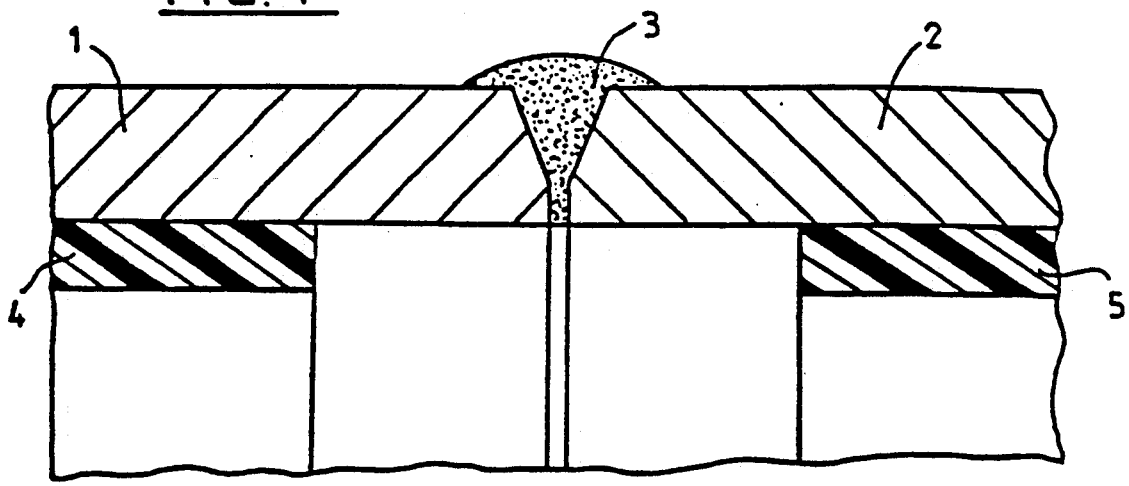
FIG. 1 is a partial axial section view of the portions of the two joined pipes before the finishing of the covering.
Figure 2:
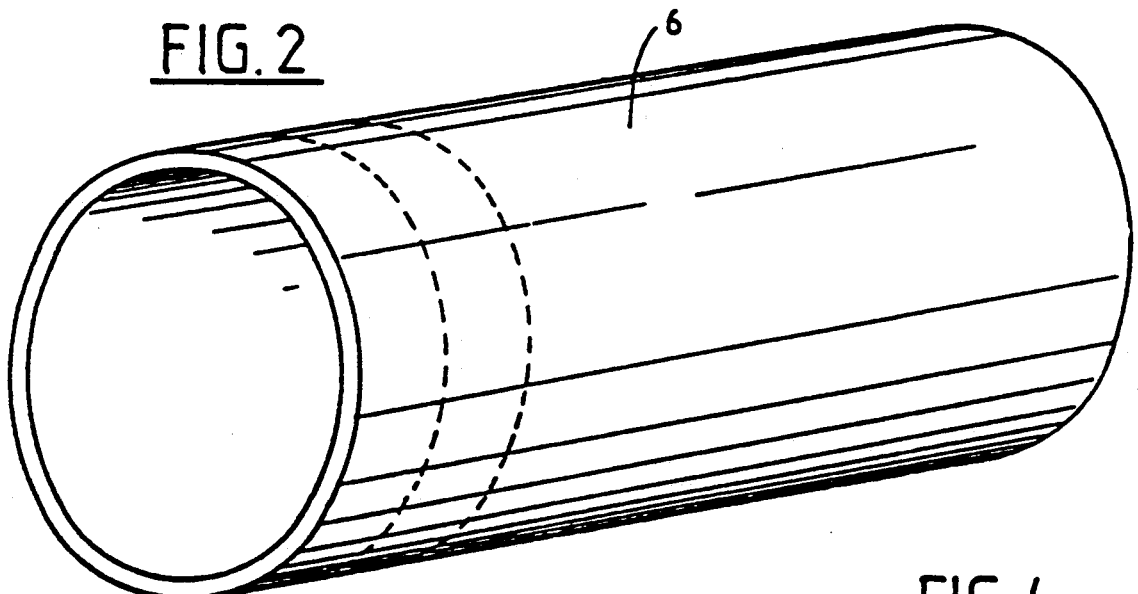
FIGS. 2, 3 and 4 are perspective views of the successive stages in the preparation of the strip of material.
Figure 3:
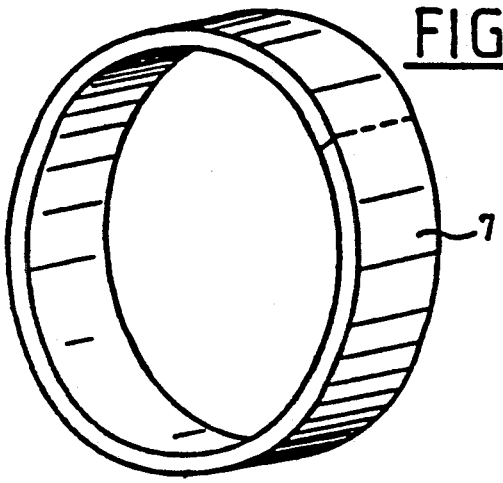
Figure 4:
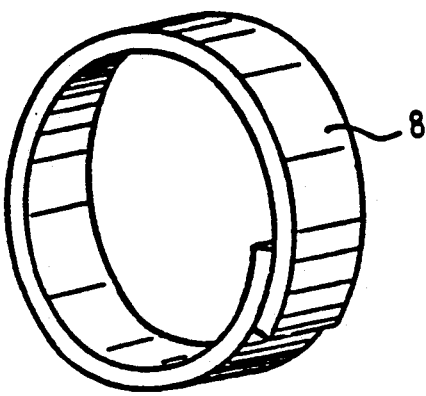

FIG. 2 illustrates the use of a pipe 6 based on fusible heat-sensitive material. In FIG. 3 there is shown a ring 7 obtained by cross-cutting the pipe 6 along the two broken lines of FIG. 2. As a result of transverse cutting of the ring 7 along the broken line of FIG. 3 and of hot-forming performed on a mandrel, a strip of material 8 is obtained as shown in FIG. 4.

Figure 5:
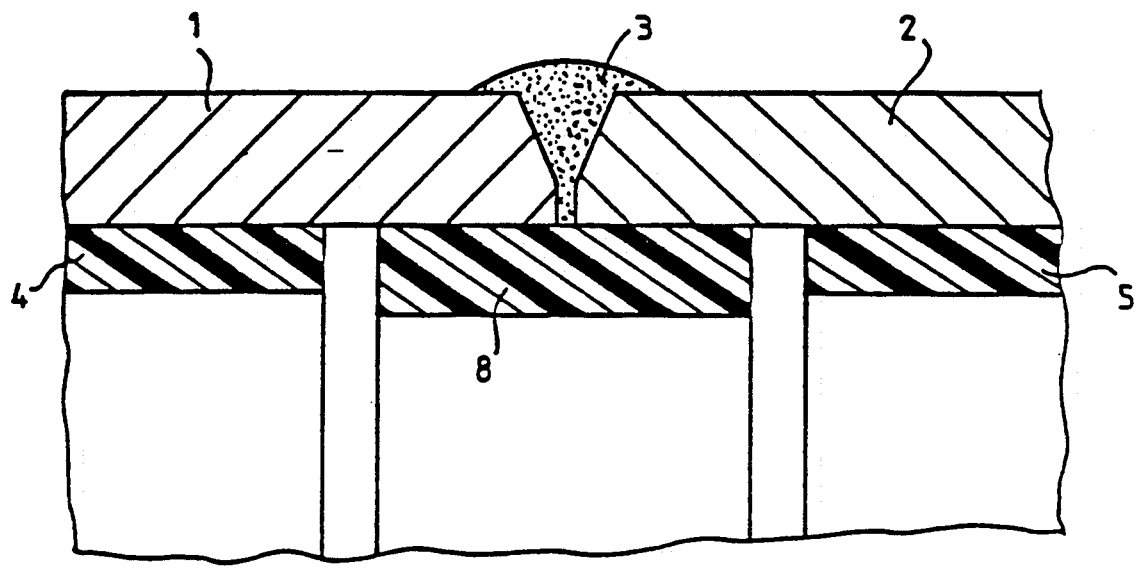
FIG. 5 is a partial axial section view of the portions of the two joined pipes shown in FIG. 1, during the execution of the finishing of the covering.

FIG. 5 shows the strip of material 8 at the moment when it comes in contact, via its outer face, with the part 1A still not covered after joining. As noted earlier, the strip 8 has a longitudinal width LW of 0.60 to 0.90 times the longitudinal width LW' of a space S bounded by the uncovered part 1A and the adjacent ends 4A, 5A of the coverings. The radial thickness T of the strip is 1.10 to 1.65 times the radial thickness T' of the space S. The volume of the strip is substantially equal to the volume of the space S.

Figure 6:
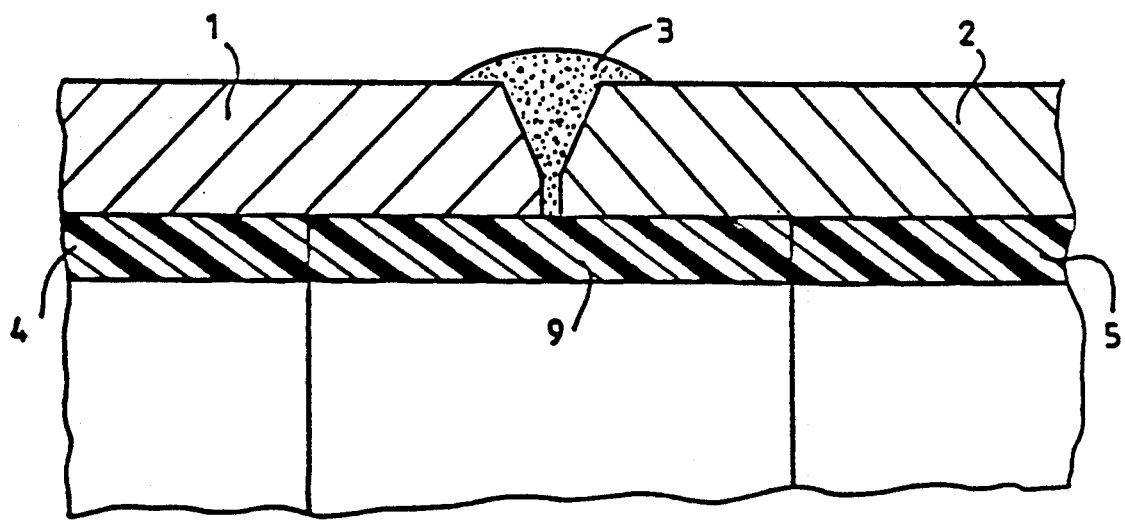
FIG. 6 is a partial axial section view of portions of the two joined pipes which are the subject of the invention.
Figure 9:
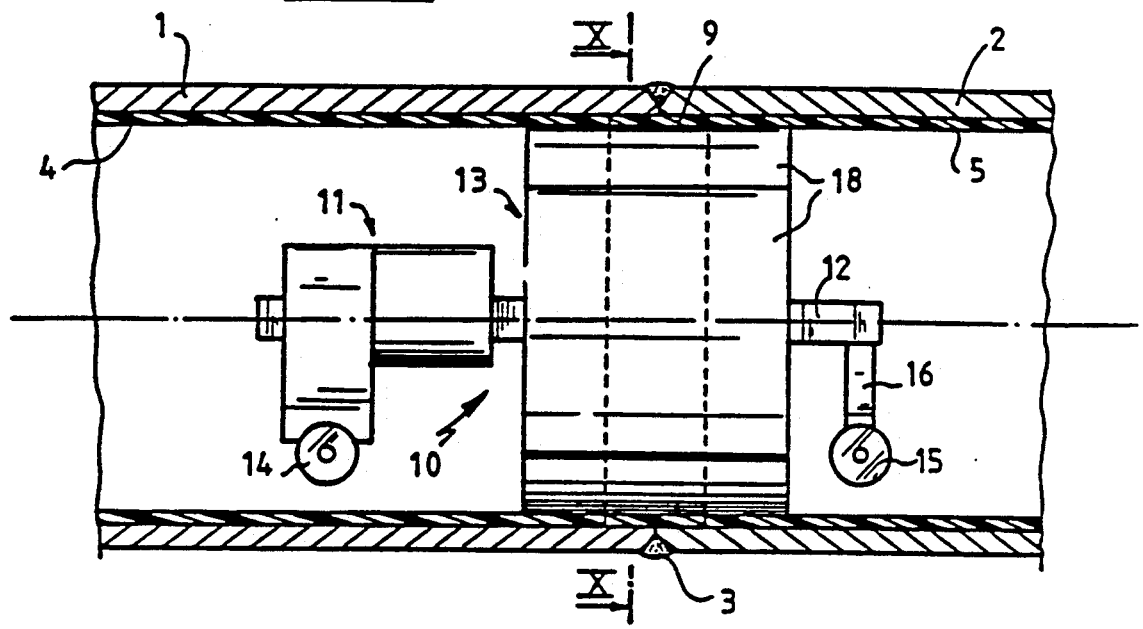
FIG. 9 is an axial section view of the pipes and a side elevational view of a self-propelled carriage in the stopping position inside the joined pipes shown in FIG. 1, at the location appropriate for executing the finishing of the covering, immediately after the finishing has been executed.
Figure 10:
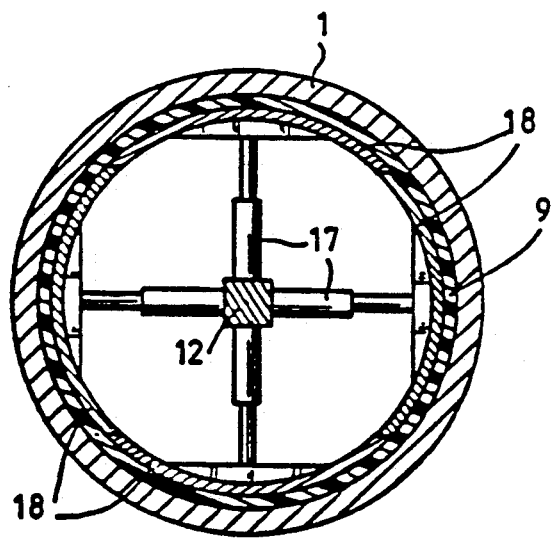
FIG. 10 is a sectional view along the line X—X of FIG. 9.

In FIGS. 6, 9 and 10 the heat-sensitive covering 9 is illustrated with which the part still uncovered after joining is equipped.

As shown in FIG. 7, a self-propelled carriage 20 positionable in a pipe 1 comprises a drive unit 11 mounted on a supporting beam 12 of square cross-section and oriented along the axis of the pipes 1 and 2. A device 13 is also provided for applying the strip of material 8, via its outer face, to the part still uncovered after joining and for exerting pressure on the inner face 8A of the strip of material 8. The carriage 10 is equipped with two wheels 14 driven by the drive unit 11 and includes two additional wheels 15 mounted on an axle (not shown) supporting the frame element 16 fastened to the supporting beam 12.

The device 13 comprises four jacks mounted on the supporting beam 12 and arranged uniformly around its axis. Each jack 17 is mounted on one of the lateral faces of the beam 12. The end of each jack 17 is equipped with a metal clamping blade 18 in the form of an arc of a circle, wherein the outer face of the blade has a radius of curvature equal to the inner radius of curvature of the covered pipes 1 and 2. The length of the clamping blade is equal to a quarter of the length of the inner circumference of the covered pipes 1 and 2. The end edges of the clamping blades 18 are machine-bevelled in such a way that the end edges of two consecutive blades overlap closely when the clamping blades 18 are in an opening position, called an "open position", such that their outer face forms a continuous cylindrical surface of revolution of a diameter equal to the inside diameter of the covered pipes 1 and 2. The width of the clamping blades is usually between 2 and 4 times the width of the part still uncovered after joining, as measured in the axial direction of the pipes.

In this description, the term "covered pipes" means metal pipes, the inner wall of which is equipped with a heat-sensitive covering.

In FIGS. 7 and 8, the clamping blades 18 are shown in the closed position. The diameter of the mandrel, on which the strip of material 8 is hot-formed, is generally from 5 to 25%, preferably 8 to 12%, less than the diameter of the circle passing through the end edges, furthest away from the axis of the supporting beam 12, of the clamping blade 18 considered in the closed position.

In FIG. 9 and 10, the clamping blades 18 are shown in the open position.

In more general terms, the number of jacks can vary from 4 to 12, depending on the diameter of the pipe, the cross-section of the supporting beam being that of a regular polygon of which the number of sides is equal to the number of jacks, one jack being mounted on each of the lateral faces of the beam. Each jack is equipped at its end with a clamping blade in the form of an arc of a circle, of which the radius of curvature of the outer face is equal to the inner radius of curvature of the covered pipes and the length of which is equal to the quotient of the inner circumference of the covered pipes and the number of clamping blades.

The self-propelled carriage 10 also possesses elements (not shown) making it independent in operating terms: an accumulator battery, a fluid-pressure appliance and a programming device which is equipped with a system for detecting the part still uncovered after joining by means of a radioactive isotope or by means of a mechanical feeler and which successively programs the stopping of the carriage at the appropriate location, the execution of the finishing of the covering and the movement of the carriage up to the free end of one of the pipes 1 and 2.

The apparatus also possesses an induction unit (not shown) arranged around the pipes in line with the part still uncovered after joining.

With the use of the joined pipes 1 and 2, the strip of material 8 and the apparatus described above and illustrated in FIGS. 7 to 10, the process proceeds as follows:

With the clamping blades 18 being in the closed position, the strip of material 8 is arranged around the blades by hand between reference marks traced thereon. The self-propelled carriage 10 is arranged at the free end of one of the joined pipes 1 and 2. After the self-propelled carriage 10 has been set in motion, it takes up position at the appropriate location for executing the finishing of the heat-sensitive covering. Under the action of the force exerted by each jack 17 operated automatically on the inner face of the corresponding clamping blade 18 the clamping blades 18 open and thereby come up against the entire inner face of the strip of material 8, thus causing the strip of material 8 to be applied, via its entire outer face, to the part still uncovered after joining. The strip of material 8 is then brought to a fused state as a result of the heating by means of the induction unit, and the clamping blades 18 assume the open position while at the same time exerting on the inner face of the strip of material 8 sufficient pressure to thin it, widen it and weld it to the adjacent covering. The operation of the induction unit is thereafter stopped. The material brought to the fused state is solidified as a result of natural cooling or of forced cooling such as by an air jet. The clamping blades 18 then resume the closed position and the self-propelled carriage 10 travels to the free end of one of the pipes 1 and 2.

EXAMPLE

An exemplary embodiment of metal pipes joined at their ends according to the invention is as follows.

The apparatus used in this example is that described above and illustrated in FIGS. 7 to 10. The diameter of the circle passing through the end edges, furthest away from the axis of the beam, of the metal clamping blades considered in the closed position is 312 mm. The outer face of the clamping blades is polished and covered with silicone resin.

A steel pipe 12 m long and with an outside diameter of 400 mm and a wall thickness of 4 mm receives, on its inner wall, a deposit of polyamide thermoplastic material 11 having a thickness of 4 mm, there being at each end a reserve of which the dimension in the axial direction of the pipe is 60 mm.

After this pipe has been joined to another identical pipe on site by butt welding by means of a build-up bead, a strip of polyamide thermoplastic material 11 is applied, via its outer face, to the part still uncovered after joining. The strip of material is prepared in the manner described above with reference to FIGS. 2 to 4 from a tube of the material having an outside diameter of 392 mm, obtained by rotational molding, and hot-forming carried out after quenching in water brought to a temperature of 95° C. takes place on a mandrel of a diameter of 280 mm. The strip of material has a width of 80 mm and a thickness of 6 mm. The relative pressure exerted on the inner face of the strip of material is 20 kPa.

As soon as pressure is exerted, the temperature of the metal part of the pipes is raised by means of the induction-heating unit, and heating is maintained until the entire metal part contained within a zone having a width of 100 mm on either side of the weld has reached the temperature of 200° C.

As soon as the temperature of 200° C. has been reached, heating is interrupted, and forced cooling of the metal part is carried out by circulating over its surface an air stream created by a fan.

When the temperature of the metal part falls to 100° C., forced cooling is interrupted and the pressure exerted on the strip of material ceases.

After the self-propelled carriage has arrived at the free end of one of the pipes, it is found that near the junction there is a continuity of the internal protection of the joined pipes, and the heat-sensitive covering provided at the part uncovered after joining is connected intimately to the adjacent covering of the pipes 1 and 2.

The erosion resistance of the assembly produced in this way is tested by circulating inside the pipes a fluid consisting of 80 parts by weight of water and 20 parts by weight of coal formed from particles of a size between 0.5 and 2 mm, at a speed of 3.5 m/s and at a temperature of between 15° and 20° C.

After a circulation time of 15,000 hours, the loss of thickness observed at any point on each thermoplastic covering, with which the inner wall of the pipes is equipped before joining and with which the part still uncovered after joining is equipped, does not exceed 0.2 mm.

While this invention has been illustrated and described in accordance with a preferred embodiment, it is recognized that variations and changes may be made and equivalents employed herein without departing from the invention as set forth in the claims.

What is claimed is:

1. A method of producing a pipeline arrangement, comprising the steps of:
   positioning first and second metal pipe sections in end-to-end relationship, each having a radially inner wall and an axial end, said radially inner walls having heat-sensitive coverings of substantially equal diameter, at least one of said coverings terminating axially inwardly of said axial end of its respective pipe section to define an uncovered inner wall section situated between adjacent longitudinal ends of said coverings,
   welding said ends together,
   introducing a strip of fusible material radially inside of said uncovered inner wall section, said strip having a longitudinal width of 0.60 to 0.90 times that of said uncovered inner wall section and a radial thickness of 1.10 to 1.65 times that of said heat-sensitive coverings, and heating said strip while applying radially outwardly directed pressure to a radially inner surface of said strip to push said strip against said uncovered inner wall section for reducing said radial thickness and increasing said longitudinal width of said strip to cause said strip to contact said adjacent longitudinal ends of said coverings and completely cover said uncovered inner wall section.

2. A method according to claim 1, wherein said introducing step comprises introducing said strip having a volume substantially equal to that of a space defined by said uncovered inner wall section and adjacent ends of said heat-sensitive coverings.

3. A method according to claim 1, wherein said heating step comprises heating said strip while applying said radially outward pressure to said strip in the range of 10 KPa to 100 Kpa.

4. A method according to claim 1, wherein said introducing step comprises introducing said strip in a coiled state.

5. A method according to claim 4, wherein said strip is formed by cross-cutting a tube composed of said fusible material to obtain a ring of said fusible material, and transversely cutting said ring to obtain said strip.

6. A method according to claim 5, wherein said cross-cutting step comprises cross-cutting a tube having an outer diameter substantially equal to a diameter of said radially inner walls of said first and second pipe sections.

7. A method according to claim 4, wherein said coiled strip is introduced on a mobile unit.

8. A method according to claim 7, wherein said mobile unit includes a plurality of circumferentially curved blades having a longitudinal width greater than that of said space, said heating step comprising heating said strip while displacing said blades radially outwardly against said inner surface of said strip, said blades having a longitudinal width greater than that of said space.

9. A method according to claim 8, wherein after said blades have been fully outwardly displaced, radially outer surfaces of said blades form a diameter substantially the same as that of radially inner surfaces of said heat-sensitive coverings.

10. The method according to claim 1, wherein said strip is formed of a composition different from that of said heat-sensitive coverings, said method further comprising the step of depositing an adhesive bonding material to a radially outer and longitudinally facing surface of said strip prior to said heating step.

* * * * *